United States Patent
Zlokovitz et al.

[11] Patent Number: 5,097,858
[45] Date of Patent: Mar. 24, 1992

[54] CLOCK CONTROLLED GAS PRESSURE REGULATOR

[76] Inventors: Robert J. Zlokovitz, 20 Villanova La., Dix Hills, N.Y. 11746; Thomas Devaney, 47-34, 217 St., Bayside, N.Y. 11361

[21] Appl. No.: 678,903

[22] Filed: Mar. 28, 1991

Related U.S. Application Data

[63] Continuation of Ser. No. 517,163, May 1, 1990, abandoned.

[51] Int. Cl.5 ............................................. G05D 16/06
[52] U.S. Cl. ................................... 137/14; 137/489.5; 137/492.5; 137/495; 137/624.11
[58] Field of Search ...................... 137/624.11, 624.12, 137/489.5, 492, 492.5, 495, 14

[56] References Cited

U.S. PATENT DOCUMENTS

| | | | |
|---|---|---|---|
| 2,309,848 | 2/1963 | King | 137/489.5 X |
| 2,881,792 | 4/1959 | Spence | 137/489.5 |
| 3,126,911 | 3/1964 | Galley | 137/489.5 X |

*Primary Examiner*—Alan Cohan
*Attorney, Agent, or Firm*—Brooks Haidt Haffner & Delahunty

[57] ABSTRACT

A clock controlled solenoid valve selectively enables or disables one or the other of two pilot control valves, one set at a higher and the other at a lower pressure setting, for selectively changing the outlet pressure from a main regulator valve between said higher and lower settings.

5 Claims, 2 Drawing Sheets

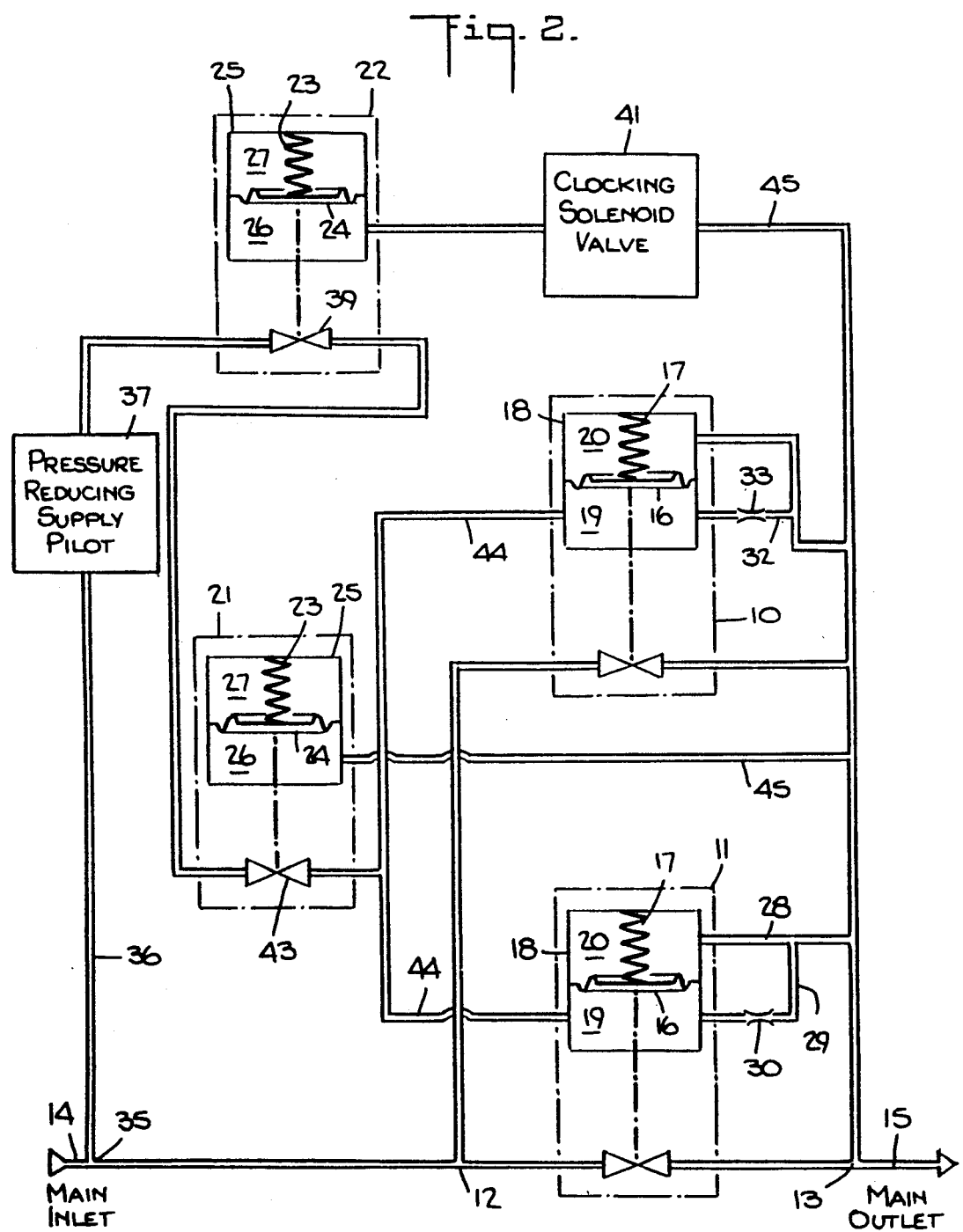

180
CLOCK CONTROLLED GAS PRESSURE REGULATOR

This application is a continuation of application Ser. No. 07/517,163, filed May 1, 1990, now abandoned.

BACKGROUND OF THE INVENTION

The present invention relates to the distribution of natural gas or the like and, in particular, to the regulation of the pressure at low pressure regulator stations located at selected points in the distribution network of a gas supply utility.

In a typical gas distribution system the gas is fed into a network of pipe lines fanning out from a central supply area and its pressure is regulated at various points along the network. To ensure against extinguishment of flames throughout the system with the attendant dangers of explosion and asphyxiation, pressures have to be maintained such that at least a predetermined minimum pressure exists at the extremities of the network for all pressure drops encountered over the range of demand. Since the demand changes with time of day, day of the week and ambient temperature, it has heretofore been the practice to maintain pressures at supply points at a sufficiently high level that the minimum pressure at the system low points would never fall below the pressure established as a safe minimum. A typical standard requires a minimum pressure of 4.5 inches water column (w.c.), which, based upon experience, has necessitated that the supply point pressure be maintained at least at about 9 or 10 inches w.c.

The pressure required at a regulator station varies from hour to hour depending on the changing load. The regulator outlet pressure required at the peak hours and the off-peak hours can differ by up to 3 inches w.c. Thus, during most of the day, a higher pressure than that required to satisfy the off peak demand must be maintained to handle the demand during the peak hours.

Unfortunately, the higher pressures contribute to increased loss to the public utility. Since the gas meters used at customer sites are not pressure compensated, gas delivered at say 8 inches w.c. as compared to that at 6 inches w.c. is under-registered by about 0.5%. In addition, the network piping is not entirely leak proof and leakage increases in direct proportion to increasing pressure. This adds to lost and unaccounted for gas. Leakage represents real cost, both in terms of the value of gas lost from the system and the cost to repair those leaks considered hazardous.

SUMMARY OF THE PRESENT INVENTION

It is therefore an object of the present invention to provide apparatus for automatically adjusting regulator valves to maintain regulator outlet pressure closer to the level actually required to ensure maintenance of the safe minimum at system extremities.

Another object of the present invention is to reduce loss of gas though pipe leakage by enabling an overall lowering of the average gas pressure over a 24 hour period through the distribution piping network.

Still another object of the invention is to provide clock control of district gas regulator valves.

In accordance with one aspect of the present invention there is provided a pressure regulating arrangement for a gas distribution system. The regulating arrangement includes means responsive to the pressure of a controlling input fluid for controlling the pressure of a gas entering a supply distribution network. Also included are means for supplying gas under pressure and controllable means coupled between said gas supplying means and said pressure controlling means for applying to the latter means a controlling input fluid under pressure for determining said pressure of gas entering said distribution network. A clock controlled solenoid valve is provided coupled to said controllable means for applying controlling signals to the latter means.

In accordance with another aspect of the present invention there is provided a method of regulating the pressure in a gas distribution system which involves the steps of providing at a supply point in said distribution system a clock controlled solenoid valve and a regulator valve assembly under its control. The clock controlled solenoid valve is preset to open and close at predetermined times of the day. The gas pressure entering said supply point is automatically regulated between a plurality of preset levels depending upon the time of day as determined by said presetting of the clock controlled solenoid valve.

BRIEF DESCRIPTION OF THE DRAWINGS

The invention will be better understood after reading the following detailed description of the presently preferred embodiments thereof with reference to the appended drawings in which:

FIG. 2 is a schematic diagram of another embodiment of the control system.

The same reference numerals are used throughout the drawings to designate the same or similar parts.

DETAILED DESCRIPTION OF THE PRESENTLY PREFERRED EMBODIMENTS

Figure 1:
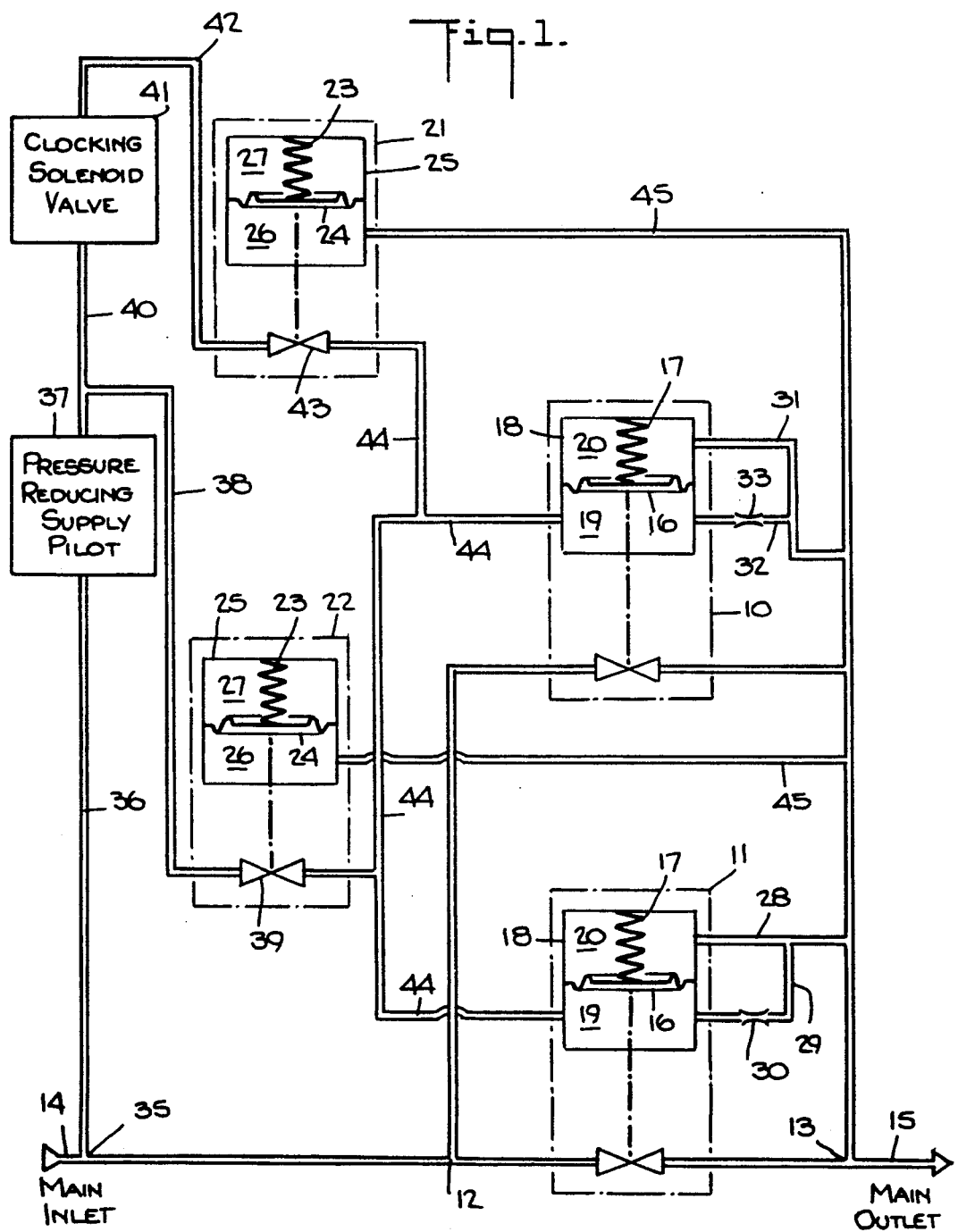
FIG. 1 is a schematic diagram of one embodiment of the control system.

Referring to FIG. 1, there is shown schematically a pressure regulating arrangement for a gas distribution system in which two main pressure regulating valves, 10 and 11, are connected in parallel between inlet junction 12 and main outlet junction 13, interconnecting the main inlet 14 with the main outlet 15. Each main regulator valve has a pressure diaphragm 16 biased by a loading spring 17 with the diaphragm 16 subdividing the housing 18 into first and second chambers, 19 and 20. Since the regulating valves 10 and 11 are identical, the same reference numerals are used for each. The main regulator valves are arranged in the absence of feed back pressure to chamber 19 to seek valve closed condition.

The regulator valves 10 and 11 are controlled by two pilot control valves 21 and 22. The valves 21 and 22, except for the setting of their respective teasing springs 23, are identical and have a diaphragm 24 separating a housing 25 into first and second chambers 26 and 27. Pilot control valves 21 and 22 are constructed for normally open valve condition in the absence of feedback pressure to chamber 26.

As shown in the drawing, the junction 13 is connected via line 28 to chamber 20 of valve 11 and via branch line 29 through an orifice 30 to chamber 19 of valve 11. Similarly, junction 13 is connected via line 31 to chamber 20 of valve 10 and via branch line 32 through an orifice 33 to chamber 19 of valve 10.

Control fluid under regulated pressure is obtained from main inlet 14 via junction 35 through line 36 and a pressure reducing supply pilot 37. From supply pilot 37 a first line 38 supplies the valve 39 in pilot control valve 22 while a second line 40 extends through a clocking solenoid valve 41 and through line 42 to the valve 43 in pilot control valve 21.

The valves 39 and 43, as shown, have their outlets connected in parallel by piping 44 to the chambers 19 of valves 10 and 11. Finally, lines 45 interconnect chambers 26 of valves 21 and 22 with the main outlet junction 13.

"Fisher" Type 1098 regulator valves are presently preferred for regulators 10 and 11, while "Fisher" Y-600P pilot regulator valves implement valves 21 and 22 with their spring biased pneumatically adjustable diaphragm 24.

Pressure reducing supply pilot can be any suitable regulating valve to provide controlling fluid, here the gas, at a pressure of, for example, 5 to 10 p.s.i. The clocking solenoid valve is presently implemented by a Donkin Electroclock produced by Bryan Donkin Ltd. of Chesterfield, England. The device contains a solenoid controlled valve with the solenoid under the control of a clock powered by a lithium battery and programmable to provide up to three on/off changes in any 24-hour period.

Pilot valve 21 is preset to provide a controlled output at some high pressure level such as 9.5" w.c., while pilot valve 22 is preset to a lower value of, for example, 7.5" w.c. So long as clocking solenoid valve is closed, control remains with valve 22 maintaining main outlet pressure at line 15 at the lower pressure setting. Whenever solenoid valve 41 opens, control shifts to pilot valve 21 which overrides valve 22 and maintains outlet pressure at the higher setting.

Thus, during the night, for example, when gas consumption is expected to drop, the lower pressure can be maintained, while during daylight hours, the higher pressure is effective.

Referring now to FIG. 2, somewhat better control can be obtained by connecting the valves 21 and 22 in series and relocating the clocking solenoid valve 41 as illustrated. It should be noted, however, that whereas the higher setting pilot valve 21 was controlled in the embodiment of FIG. 1 by the clocking solenoid valve 41, in FIG. 2 the clocking solenoid valve 41 controls the lower setting pilot valve 22. Thus, when solenoid valve 41 is open the pilot valve 22 is in control maintaining the lower outlet pressure. But, when solenoid valve 41 is closed there is no feedback pressure to chamber 26 of valve 22 and it remains wide open releasing control to the higher setting valve 2 which is in series with it. In all other respects the operation is similar to that of FIG. 1.

Having described the present invention with reference to the presently preferred embodiment thereof, it should be understood that various changes in construction can be introduced by those skilled in the subject art without departing from the true spirit of the invention as defined in the appended claims.

What is claimed is:

1. A pressure regulating arrangement for a gas distribution system comprising in combination, pressure regulating means responsive to the pressure of a controlling gas for adjustably controlling the pressure of a gas entering a supply distribution network, means for supplying pressurized gas, bi-directionally controllable pressure controlling means coupled between said pressurized gas supplying means and said pressure regulating means for applying to the latter means controlling gas under a plurality of selectable pressures for determining said pressure of gas entering said distribution network, and a clock controlled solenoid actuating means coupled to said controllable pressure controlling means for bi-directionally controlling the latter means to select said plurality of controlling gas pressures in any desired sequence and thereby the pressure of the gas entering said supply distribution network.

2. A pressure regulating arrangement for a gas distribution system comprising in combination at least one main regulator valve interposed between a main gas supply line and an outlet distribution point, a plurality of pilot control valves coupled to said main regulator valve for supplying gas under controlled pressure to said regulator valve for determining the regulated outlet pressure from said main regulator valve, each of said pilot control valves being preset to provide a different output pressure when actively operative, and a clock controlled solenoid valve connected to one of said pilot control valves for selectively enabling or disabling said one pilot control valve from determining the outlet pressure of said main regulator valve.

3. A pressure regulating arrangement according to claim 2, wherein there are two of said pilot control valves, one preset to a higher setting and one preset to a lower setting, and said clocking solenoid and said pilot control valve that is preset to the higher pressure setting are connected in series in parallel with the other of said two pilot control valves to said main regulator valve.

4. A pressure regulating arrangement according to claim 2, wherein there are two of said pilot control valves, one preset to a higher setting and one preset to a lower setting, said pilot control valves being connected in series to control said main regulator valve, and said clocking solenoid valve interconnects the outlet of said main regulator valve with said pilot control valve that is preset to the lower pressure setting.

5. A method of regulating the pressure in a gas distribution system which comprises in combination the steps of providing at a supply point in said distribution system a clock controlled solenoid valve, a pair of pilot control valves, and a main regulator valve, presetting said pilot control valves, one to a higher pressure setting and one to a lower pressure setting, interconnecting said solenoid valve with one of said pilot valves and interconnecting said pilot valves with said main regulator valve for selectively adjusting said main regulator valve to either said higher or said lower pressure setting, and setting said clock controlled solenoid valve to enable one of said pilot valves while disabling the other in its control of the main regulator valve depending upon the time of day.

* * * * *